(12) United States Patent
Rao et al.

(10) Patent No.: US 6,359,416 B1
(45) Date of Patent: Mar. 19, 2002

(54) ADAPTIVE PREDICTIVE SYNCHRONOUS CURRENT FRAME REGULATOR METHOD AND APPARATUS (75) Inventors: Aakash Vishalraj K. Rao, Sunnyvale, CA (US); Russel J Kerkman, Milwaukee; David W. Schlegel, Saukville, both of WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/677,036

(22) Filed: Sep. 29, 2000

(51) Int. Cl.[7] .................................................. H02P 5/28
(52) U.S. Cl. ....................... 318/727; 318/609; 318/727; 318/825; 388/906
(58) Field of Search .............................. 318/609, 727, 318/738, 801, 825; 388/906

(56) References Cited

U.S. PATENT DOCUMENTS

| 5,166,593 A | * | 11/1992 | De Doncker et al. ....... 318/800 |
| 5,253,155 A | * | 10/1993 | Yamamoto .................... 363/71 |
| 5,329,217 A | * | 7/1994 | Kerkman et al. ............. 318/811 |
| 5,541,488 A | * | 7/1996 | Bansal et al. ................. 318/801 |
| 5,619,114 A | * | 4/1997 | Blasko ......................... 318/812 |
| 5,850,132 A | * | 12/1998 | Garces et al. ................ 318/599 |

* cited by examiner

Primary Examiner—Robert E. Nappi
Assistant Examiner—Rita Leykin
(74) Attorney, Agent, or Firm—Michael A. Jaskolski; Alexander M. Gerasimow; William R. Walbrun (57) ABSTRACT

A method and apparatus for controlling a synchronous frame current regulator wherein the apparatus includes a current predictor and a current predictor adjuster, the current predictor predicting the current provided to a plant from both a forcing function and an actual current value and the adjuster adjusting the current prediction based on a difference between the current prediction and the actual current sampled thereby driving the actual current so as to conform with a commanded current value.

19 Claims, 5 Drawing Sheets

ADAPTIVE PREDICTIVE SYNCHRONOUS CURRENT FRAME REGULATOR METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to synchronous frame current regulators and more specifically to an adaptive predictive current regulator that increases system bandwith while maintaining current overshoot within an acceptable range.

In virtually any control environment the goal is to cause a specific result instantaneously when a specific command signal is provided. While the stated goal is simple, the solution for achieving the stated goal often is much more complex as hardware required to facilitate instantaneous results often have unknown or variable characteristics and hardware controlling systems often cause processing delays that are difficult to eliminate.

One area of the controls industry in which precise control is particularly important is in motor control or control of other inductive type machines. In these cases often even a slight delay in system control can result in loss of motor control, motor and control system damage or expedited degradation. For this reason many motor control systems include several different control or feedback loops that compare command signals to resulting signals to generate error signals and then adjust the command signals as a function of the error signals in an effort to eliminate the control error.

To this end vector motor drives include a current regulator as an innermost control loop with other control loops nested around the current regulator. Because other loops are nested around the current regulator any error generated by the current regulator can be exacerbated by the other loops. For this reason the current regulator typically needs to be extremely accurate and highly responsive.

As well known in the controls industry, most vector drives perform current regulation on electrical reference frame variables to ensure zero steady state error. Electrical reference frame variable regulators are commonly referred to in the motor control industry as synchronous frame current regulators (SFCRs).

Figure 1:
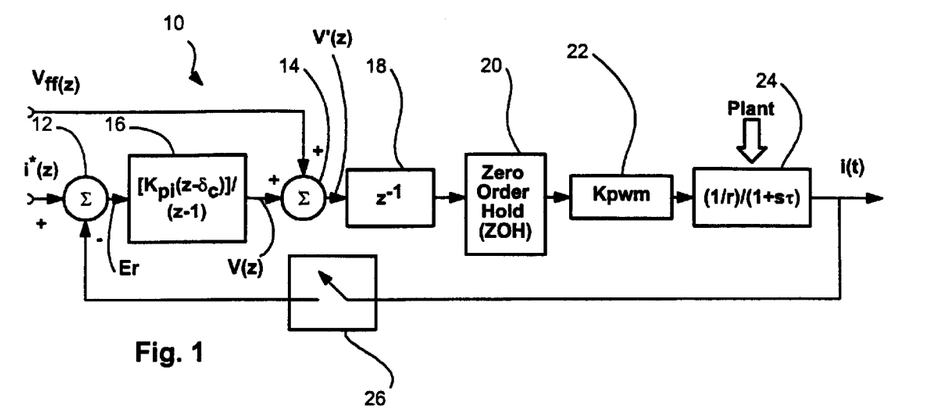
FIGS. 1, 1a is a schematic diagram of a prior art current regulator.

Referring to FIG. 1, a typical SFCR in the sampled data and continuous domain system 10 is illustrated that includes a plurality of blocks that together model an inductive load and associated control system. All of the events and calculations in FIG. 1 occur inside a microprocessor or within other motor drive or motor hardware controlled by the processor. Nevertheless, system 10 is represented as discrete events and calculations in order to generate transfer functions and current predicting equations that must be understood for a thorough understanding of the present invention.

System 10 includes first and second summers 12, 14, respectively, a proportional-integral (PI) compensator 16, a unit sample delay 18, a zero order hold (ZOH) 20, a pulse width modulator (PWM) gain block 22, a plant "effect" model or block 24 and a sampler 26.

First summer 12 receives each of a current command signal i*(z) and a sampled current signal i(z) and subtracts the sampled signal from the command signal to generate a current error signal Er. Pi compensator 16 receives error signal Er and steps that signal up as a function of a PI gain factor Kpi thereby generating a voltage adjustment signal V(z). The PI compensator 16 function can be expressed as:

$$\frac{k_{pi}(z - \delta_c)}{z - 1} \qquad \text{Eq. 1}$$

Second summer 14 receives the voltage adjustment signal V(z) and a voltage feedforward signal Vff(z) from another control loop sampler (not illustrated) and adds the received signals to generate an adjusted voltage signal V(z)'.

The unit sample delay 18 and the ZOH 20 are provided in system 10 to represent the finite update rate of practical conventional control loop configurations.

Voltages having specific amplitudes and frequencies are generated using PWM inverters. As well known in the motor controls industry a PWM inverter typically includes a plurality of switching devices that alternately link positive and negative DC buses to output lines thereby causing a series of positive and negative voltage pulses on the output lines. The average of the voltage pulses over a PWM cycle causes an alternating voltage at the output. Where a load is linked to the output the alternating voltage causes an alternating current across the load. PWM block 22 represents the gain effects of a conventional PWM inverter as represented by a gain factor Kpwm. The effect of block 22 is to modify the received signal by factor Kpwm. The output of block 22 is provided to plant block 24.

Every plant or load linked to PWM inverter outputs has some effect on the current provided to the plant. For example, where the plant is inductive (e.g., in the case of an induction motor), current provided to the plant cannot change immediately and therefore, even where an inverter is controlled to cutoff voltage to the plant, the inductive plant will still draw some current from the inverter. In general, the effect of a plant on received current is a function of both load resistance $r_s$ and load inductance L and can be expressed in the continuous domain by the equation:

$$\frac{\frac{1}{r_s}}{1 + s\tau} \qquad \text{Eq. 2}$$

where $\tau$ equals a load time constant L/rs. Thus, "plant effect" is modeled as illustrated in block 24 and current i(t) represents the current provided to the plant via a PWM inverter.

Figure 1A:
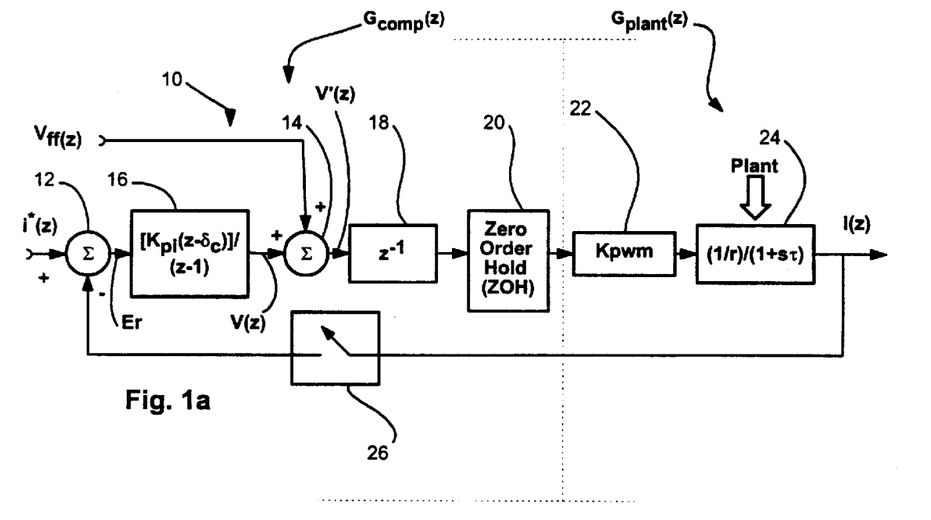

Referring to FIGS. 1 and 1a, system 10 can be represented in the z-domain as two gain blocks $G_{comp}(z)$ and $G_{plant}(z)$. In FIGS. 1a and 1 similarly numbered components are identical.

Sampler 26 links the plant current i(z) to first summer 12 and samples the plant current i(z) at intervals T, providing a new sampled current i(t) every T interval.

Referring still to FIG. 1, the positions of the feedforward sampler (i.e., providing Vff(z)) and feedback sampler 26 result in an explicit transfer function between the current command i*(z) and current feedback i(z) such that the overall system gain G(s) can be expressed as: $G(s)=G_{comp}(z)*G_{plant}(z)$. It is customary to set the proportional and integral gains of the PI compensator so as to cancel the dominant dynamics (i.e., the pole) of the plant, which are typically the slowest dynamic in a practical control system. If such a pole-zero cancellation is assumed, the current regulator/R-L load reduces to a second order system with an open loop transfer function G(z) expressed as:

$$G(z) = \frac{K_{pi}K_{PWM}(1-e^{-T/\tau})/r_s}{z(z-1)} = \frac{i(z)}{i^*(z)} \quad \text{Eq. 3}$$

Thus, the closed loop transfer function of system 10 in FIG. 1 has two poles at locations governed by the PI compensator gain Kpi. As compensator gain Kpi is increased the poles in Equation 3 depart from the real axis, an occurrence that indicates an undesirable oscillatory characteristic.

As well known in the motor controls industry oscillation problems are exacerbated as the system operating bandwidth is increased. When the operating bandwidth includes relatively high frequencies overshoot is increased. Thus, one solution for dealing with second order system overshoot and resulting oscillations is to reduce the system operating bandwidth. Unfortunately, when bandwidth is reduced response time is increased (i.e., settling time is increased).

Figure 2:
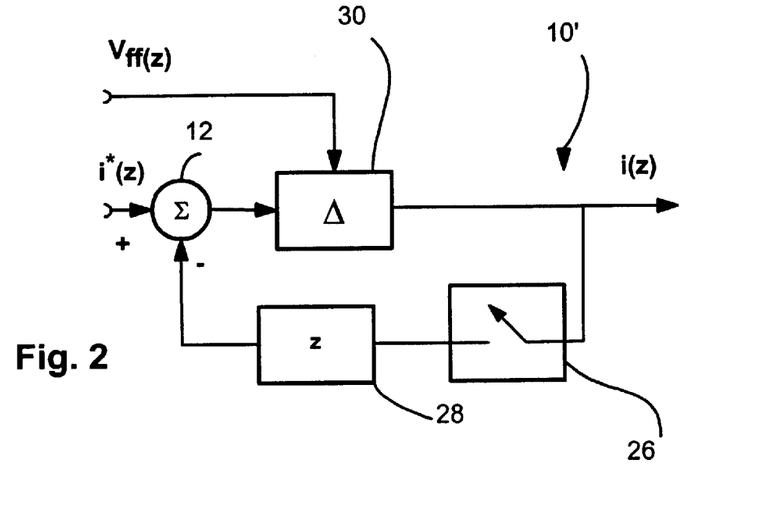
FIG. 2 is a similar to FIG. 1 and 1a, albeit including a unit sample advance and a feedback path.

Another solution for dealing with oscillations in a second order system is to provide a predictor that acts as a unit sample advance in the current feedback loop. A unit sample advance 28 in the feedback loop is illustrated in FIG. 2 where block 30 represents blocks 16, 18, 20, 22 and 24 and summer 14 from FIG. 1. The open loop gain $G_p(z)$ of the current regulator in FIG. 2 can be expressed as:

$$G_p(z) = \frac{K_{pi}K_{PWM}(1-e^{-T/\tau})/r_s}{(z-1)} \quad \text{Eq. 4}$$

Thus, the current regulator 10' of FIG. 2 operates as a first order system cascaded with a unit sample delay, thereby decoupling the dynamics of the computation delay from those of PI compensator 16 (see FIG. 1). System 10' closed loop poles do not depart from the real axis, a characteristic that indicates an essentially first order response. In fact, the gain of the PI compensator can now be increased to a high enough value to achieve a dead beat response, a threefold improvement in the responsiveness of the current loop.

Referring again to FIG. 1, an R-L load corresponding to plant model 24 forms a first order system and as such its behavior can be predicted from a knowledge of its initial condition (i.e., initial current i(z)) and a forcing function (i.e., the applied voltage). In FIG. 1, using the notation employed above in Equations 3 and 4, the current at sampling instant k+1 can be expressed as:

$$i(k+1) = i(k)e^{-T/\tau} + V(k-1) \times \frac{(1-e^{-T/\tau})}{r_s} \times K_{PWM} \quad \text{Eq. 5}$$

For typical control system implementations load time constant $\tau$ is far larger than the sampling interval T. For this reason Equation 5 can be further simplified as:

$$i(k+1)=i(k) \times (1-r_s T/L) + V(k-1) \times K_{PWM} T/L \quad \text{Eq. 6}$$

where L=load inductance.

Equation 6 constitutes the predictor equation used to introduce the unit sample advance in the feedback path as shown in FIG. 2. The use of such a predictor equation, however, necessitates an accurate estimate of load time constant $\tau$ (i.e., $\tau=L/r_s$) and resistance $r_s$. Inaccuracies in these estimates can lead to steady state errors, and, in extreme cases can cause oscillatory behavior.

Estimating the time constant $\tau$ and resistance $r_s$ is not an easy task and often requires highly skilled engineers to render acceptable estimated values. For this reason commissioning of regulators that require accurate time constant $\tau$ and resistance $r_s$ estimates is relatively expensive.

Thus, there is a need for a system that eliminates the need for accurate time constant $\tau$ and resistance $r_s$ estimates that is inexpensive and computationally simple to implement.

BRIEF SUMMARY OF THE INVENTION

The present inventors have recognized that, in addition to providing a predictor in a feedback loop, an adjuster can also be provided that, based on a comparison of an actual current and the predicted current, can modify the forcing function to expedite regulator response time without requiring accurate time constant $\tau$ and resistance $r_s$ estimates.

To this end, an exemplary embodiment of the invention is used with a current regulator and an inverter to provide current to an induction machine. The regulator includes a summer and a PI compensator. The summer subtracts a predicted current signal from a current command signal to generate an error signal. The compensator receives and modifies the error signal to generate a forcing signal used to control the inverter. The inventive apparatus includes a sampler linked to motor supply lines for sampling the actual current and providing a sampled current signal, a predictor that receives the sampled signal and the forcing signal and mathematically combines the sampled and forcing signals to generate a predicted current signal. An adapter receives the predicted current signal and the sampled signal and when the predicted signal is greater than the sampled signal, causes the predictor to reduce the predicted signal and, when the predicted signal is less than the sampled signal, causes the predictor to increase the predicted signal.

When the predicted signal is not equal to the actual sampled current signal clearly assumptions manifest in the computations that implement the predictor are inaccurate and the predicted current signal should be modified. More specifically, the predicted signal should be altered so that the predicted signal more closely resembles the actual sampled signal as required by the present invention.

Thus, one object of the invention is to provide a predictive current regulator that automatically identifies when a predicted current calculating algorithm is inaccurate and adjusts the predicted current signal appropriately.

A related object of the invention is to eliminate the need for a highly skilled engineer to program a current regulator with resistance $r_s$ and time constant $\tau$ value estimates. Because the inventive system modifies the predictor calculation based on perceived inaccuracies in the calculation, even where relatively inaccurate system value estimates are provided to the regulator, the regulator will compensate appropriately.

One other related object is to reduce current overshoot and setting time. To this end, the predicted signal adjustments cause the PI compensator to generate a forcing function that drives the plant current to the commanded value much more quickly than in systems that do not employ such control tactics.

By adjusting the predicted signal value to be more like the sampled current value, regulator operation is affected in two related ways that tend to reduce overshoot and settling time. First, the summer and PI compensator generate a modified gain that adjusts the forcing function to ensure zero steady-state error between the predicted and sampled current. For example, where the predicted current is greater than the sampled current the forcing function is decreased to ensure the predicted current equals the sampled current in steady-state. Second, because the gain now more closely reflects the actual system gain the predicted current will more closely represent the future system current in the next cycle and will reduce potential current overshoot.

These and other objects, advantages and aspects of the invention will become apparent from the following description. In the description, reference there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 3:
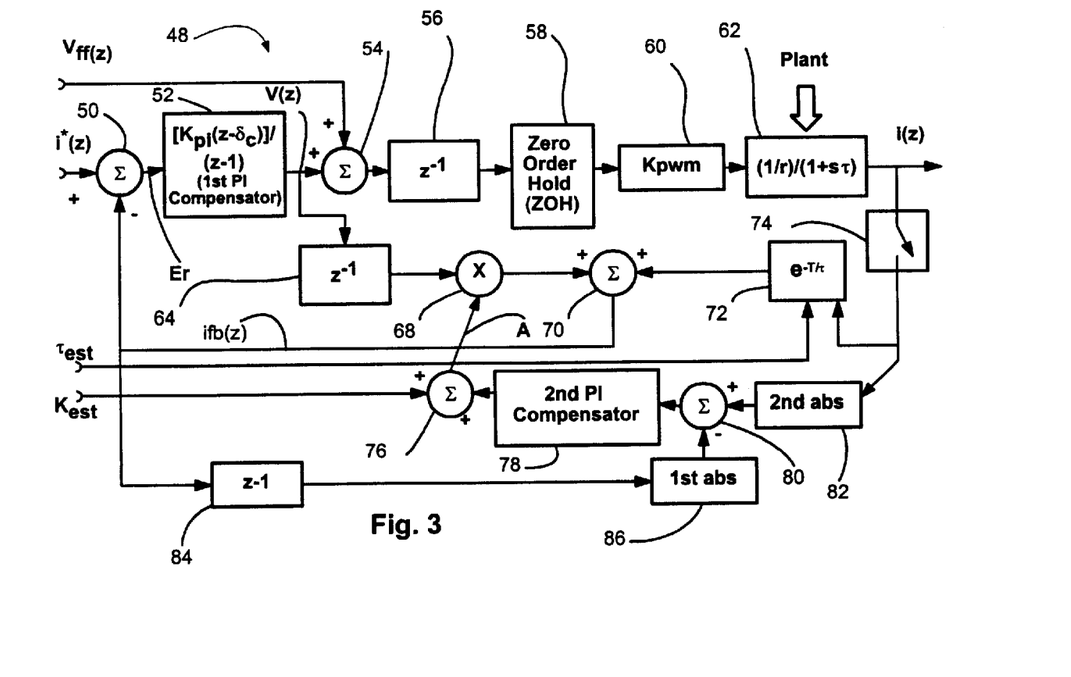
FIG. 3 is a schematic diagram of the inventive regulator topology.

Referring now to FIG. 3, the present invention will be described in the context of the exemplary system 48 illustrated. System 48 includes first through fifth summers 50, 54, 70, 76 and 80, respectively, first and second PI compensator 52 and 78, first, second and third delay blocks 56, 64 and 84, a zero order hold (ZOH) 58, a PWM gain block 60, a plant model block 62 (e.g., a motor and load linked to the inverter corresponding to gain block 60), a sampler 74, a gain block 72 related to the sampling period T and the load time constant $\tau$, first and second absolute value blocks 82 and 86, a multiplier 68, and a plurality of lines that link the aforementioned components and allow various inputs that will be described in more detail below.

Summer 50 receives a command current $i^*(z)$ and a current feedback or current predicted signal $i_{fb}(z)$ and subtracts the predicted signal $i_{fb}(z)$ from the commanded signal $i^*(z)$ thereby generating an error signal $E_r$ which is the commanded signal $i^*(z)$ thereby generating an error signal $E_r$ which is provided to compensator 52. Compensator 52 steps up the error signal generating a forcing signal which is provided to summer 54. Summer 54 also receives the feedforward voltage signal $V_{ff}(z)$ from another control loop (not illustrated) and adds the feedforward signal $V_{ff}(z)$ and the forcing signal providing an output to delay block 56. The output of delay block 56 is provided to ZOH 58 and the output ZOH is provided to PWM gain block 60 where the received signal is multiplied by PWM gain value $K_{PWM}$. The output of blocks 60 is provided to plant block 62 which models the effects of the plant on the current provided by the inverter corresponding to block 60. The output of block 62 is the actual current $i(t)$. Sampler 74 is linked to the output plant block 62 to sample the actual current $i(t)$. The output of sampler 74 is provided to gain block 72 and to absolute value block 82.

In addition to receiving the sampled signal, gain block 72 also receives a load time constant estimate $\tau_{est}$ which can be input by a system operator or commissioner. Because all occurrences and calculations manifest in system 48 occur inside a processor and this processor controls the sampling interval T, the processor knows time interval T and can determine gain $e^{-T/\tau}$ after the estimate $\tau_{est}$ is provided. Block 72 multiples the sampled signal by gain $e^{-T/\tau}$. The output of gain block 72 is provided to summer 70.

Referring still to FIG. 3, the forcing function provided by block 52 is also provided to delay block 64. The output of block 64 is provided to multiplier 68. Thus, the forcing function that causes the actual current $i(t)$ as an output to block 62 is provided to multiplier 68 while the sampled current $i(z)$ is modified and provided to summer 70. Multiplier 68 and summer 70 cooperate to generate the predicted signal $i_{fb}(z)$ which is provided to summer 50.

As indicated above, the predicted current $i_{fb}(z)$ is, according to the present invention, adjusted or modified as a function of the relationship between the predicted current $i_{fb}(z)$ and the actual sampled current $i(z)$. To this end, system components 76, 78, 80, 82, 84 and 86 cooperate to determine the relationship between the predicted current signal $i_{fb}(z)$ and the actual sampled signal $i(z)$ thereby generating an adjustment signal A which is provided as the second input to multiplier 68.

Referring still to FIG. 3, predicted current signal $i_{fb}(z)$ is provided to delay block 84 and the output of that block is provided to the first absolute value block 86. Absolute value block 86, as the name implies, provides as an output the absolute value of the input. The output of block 86 is provided to summer 80. The sampled current signal from sampler 74 is received by second absolute value block 82 and the output of that block provides the absolute value of the sampled signal to summer 80. Summer 80 subtracts the absolute value of the predicted current signal $|i_{fb}(z)|$ from the absolute value of the sampled signal $|i(z)|$ generating an error signal which is provided to second PI compensator 78. Compensator 78 steps up the error signal and provides that signal to summer 76.

Summer 76 receives a $K_{est}$ value which, like the time constant $\tau_{est}$, is provided by a system operator or commissioner. Value $K_{est}$ is related to the plant modeled by block 62. Summer 76 adds its two inputs and provides the adjustment signal to multiplier 68.

Multiplier 68 multiplies the delayed forcing function from block 64 and the adjustment signal from summer 76 and generates a modified forcing function which is provided to summer 70. Summer 70 adds the modified forcing function and the stepped up sampled current signal from block 72 to generate the predicted current signal $i_{fb}(z)$.

Figure 7:
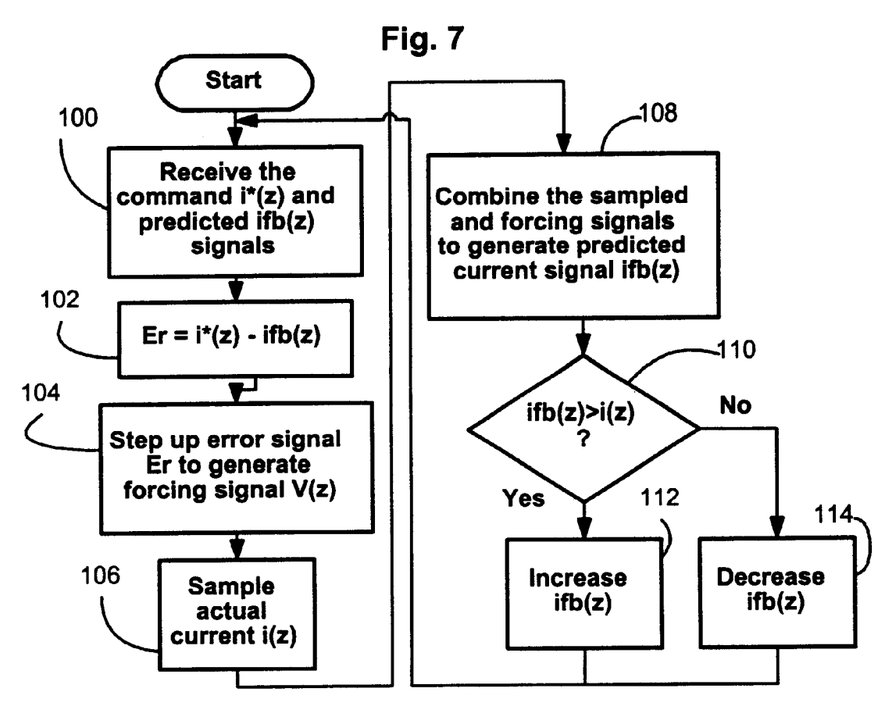
FIG. 7 is a flowchart illustrating an exemplary inventive method.

Referring to FIG. 7, the inventive method is illustrated. Referring also to FIG. 3, in operation, when command signal $i^*(z)$ and predicted signal $i_{fb}(z)$ are received by summer 50 at block 100, summer 50 subtracts the predicted current signal $i_{fb}(z)$ from the command signal $i^*(z)$ at block 104 generating the error signal $E_r$ which is stepped up by compensator 52 at block 104 to generate the forcing function $V(z)$. The forcing function is added to the voltage feedforward signal $V_{ff}(z)$ to generate a signal for controlling the PWM inverter represented by gain block 60. The inverter generates current which is affected by the plant represented by block 62, and generates resulting current $i(z)$. At block 106 the actual current $i(z)$ is sampled and at block 108 the forcing signal or function $V_{(z)}$ is combined with the sampled current signal $i(z)$ to generate the predicted current signal $i_{fb}(z)$. In FIG. 3, the loop corresponding to blocks 64, 72 and 70 effectively combine the forcing function and the sampled current to generate the predicted current $i_{fb}(z)$. Blocks 84, 86 and 82, compensator 78 and summers 76 and 80 cooperate with multiplier 68 to adjust the predicted current signal $i_{fb}(Z)$ as a function of the difference between the actual sampled current $i(z)$ and the predicted current $i_{fb}(z)$. For instance, assuming the actual current $i(z)$ is less than the predicted $i_{fb}(z)$, summer 80 generates a negative value which is provided to compensator 78. Compensator 78 steps up the negative value which ripples through summer 76, multiplier 68 and summer 70 to reduce the predicted current signal value $i_{fb}(z)$. When signal $i_{fb}(z)$ is reduced, the magnitude of the error signal provided by summer 50 is increased thereby tending to increase the actual current $i(z)$ drawn by the plant represented by block 62. Similarly, at block 110 in FIG. 7, when the actual current $i(z)$ is greater than the predicted current $i_{fb}(z)$, summer 80 generates a positive error signal that is stepped up by compensator 78. The stepped up positive error signal ripples through summer 76, multiplier 68 and summer 70 to increase the predicted current signal $i_{fb}(z)$. When signal $i_{fb}(z)$ is increased, the error signal generated by summer 50 is modified to more rapidly drive the actual current $i^*(z)$ toward the command current $i(z)$.

Experimental validation of the proposed topology was carried out on a DSP56005 based system. The system employed current regulated PWM. The carrier frequency was 5kHz and sampling was done once per carrier cycle. The power structure was rated for a nominal DC bus voltage of 650V and the output current trip level was set at approximately 15A. Tests were carried out with a three phase, symmetric R-L load (the stator of a 5HP, 460V, 4 pole induction machine with the rotor removed). The direct and quadrature axes were therefore decoupled, resembling a field oriented induction machine. The tests were therefore restricted to the direct axis current regulator, with the quadrature axis command being set to zero throughout. The robustness of the proposed topology was tested under various conditions and found to be satisfactory.

As a general rule, conventional SFCRs can operate at bandwidths corresponding to one twentieth of the sampling frequency. For the given system, therefore, the optimal bandwidth for the conventional topology is approximately 250 Hz. The performance of the proposed topology was found to yield a twofold enhancement in the bandwidth of the current regulator. The data recorded for purposes of this disclosure therefore correspond to a bandwidth setting of 500 Hz.

Figure 4:
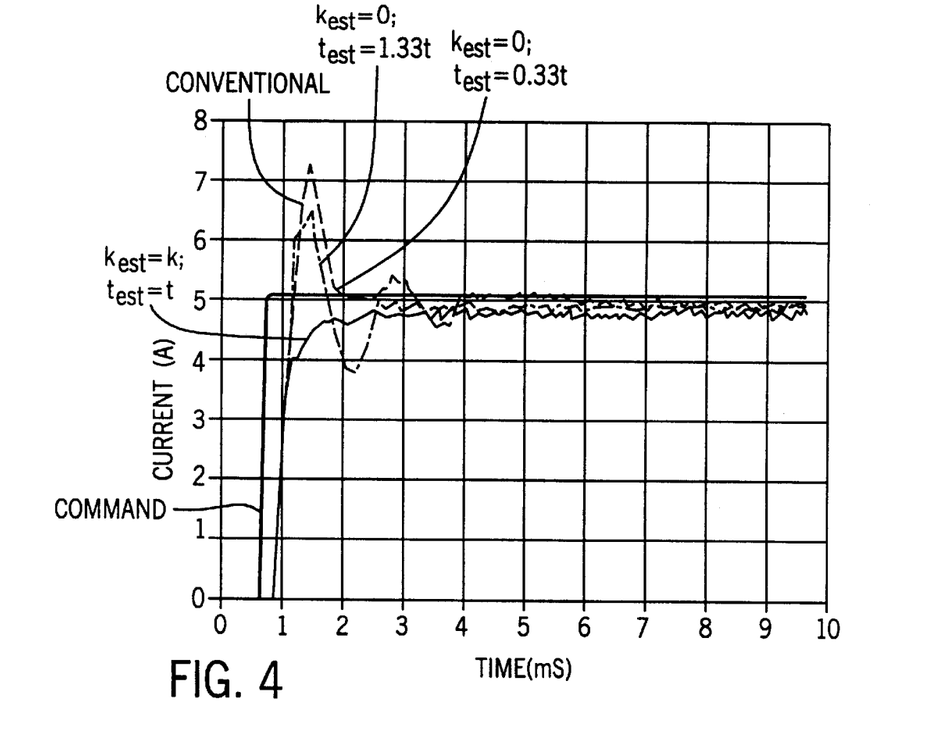
FIG. 4 is a graph illustrating the results of a step response command signal for both a conventional current regulator topology and the inventive topology at 500 Hz bandwidth.

A comparison of the step response of the proposed topology with that of the conventional topology is shown in FIG. 4 at a bandwidth setting of 500 Hz (3142 rad/sec.). The response of the proposed topology was recorded under three conditions:

(i) accurate parameter estimates $k_{est}$ and $\tau_{est}$ with the adaptive/predictive PI compensator disabled;

(ii) no initial inductance estimate, i.e. $k_{est}=0$ (see Eq. 4), $\tau_{est}=0.33\tau$, adaptive PI compensator enabled; and (iii) no initial inductance estimate, i.e. $k_{est}=0$ (see Eq. 4), $\tau_{est}=1.33\tau$, adaptive PI compensator enabled.

FIG. 4 clearly illustrates the superior performance of the inventive topology. It is seen that system 48 (see FIG. 3) exhibits first order characteristics with accurate parameter estimates and an acceptable peak overshoot and short settling time even with no initial system parameter estimates.

In fact, if the load inductance and resistance are known accurately, the system bandwidth can be set as high as 5000 rad/sec., thereby Achieving a dead beat response. In the absence of an accurate knowledge of parameters, the system bandwidth can be increased twofold to 3140 rad/sec. Only the load time constant needs to be known to within ±100% of its true value.

Figure 5:
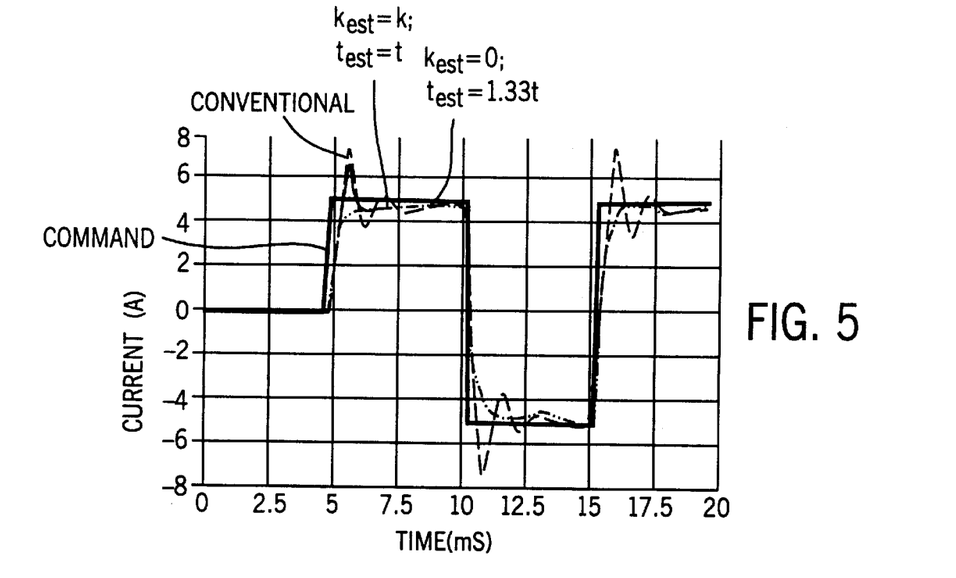
FIG. 5 is a graph similar to FIG. 4, albeit with a 100 Hz square wave command signal.

Further proof of the robustness of the inventive topology is provided by the response of the current regulator to a 100 Hz square wave current command (±1.25 pu, 10A pk-pk). The performance of the inventive system is compared to the performance of a conventional topology in FIG. 5. The inventive topology was tested under conditions (ii) and (iii) above. FIG. 5 demonstrates the stability and robustness of the inventive topology and its insensitivity to parameter inaccuracies.

Figure 6:
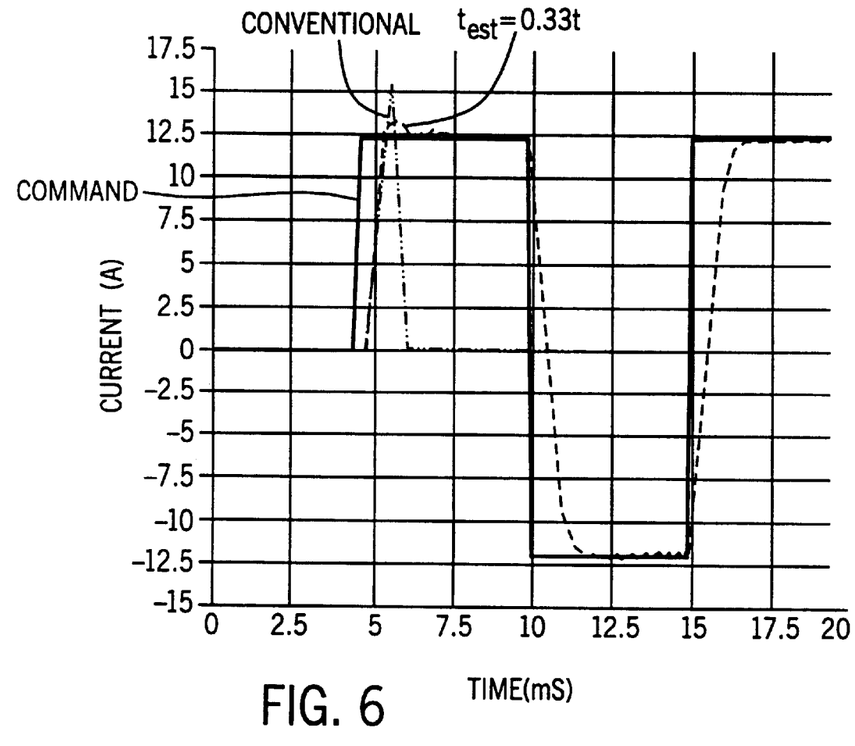
FIG. 6 is a graph illustrating a 100 Hz square wave response for both a conventional topology and the inventive topology of FIG. 3.

Another desirable feature of the inventive topology is the fact that its peak overshoot reduces in amplitude as the magnitude of the current command increases. The step of the system to a ±3 pu square wave current command (24A pk-pk) of frequency 100 Hz given in FIG. 6 illustrates this feature. A comparison of FIGS. 5 and 6 clearly shows the lower peak overshoot seen at a higher current command amplitude. FIG. 6 shows the response of the inventive topology under conditions (ii) and (iii). The response of the conventional topology to this command could not be fully recorded since the overshoot exceeded a trip threshold of the drive. It is however plotted alongside for completeness. The fact that the inventive topology could respond to the current command at the required bandwidth provides more proof of the superiority of the inventive/predictive current controller.

Implementation of the inventive topology requires two additional storage spaces and one PI regulator block. The additional computational overhead includes two multiplication operations, three addition operations and the calculations necessary to run one PI regulator. This overhead is minimal and therefore the inventive topology is inexpensive to implement.

Nothing in this application is considered critical or essential to the present invention unless explicitly indicated as being "critical" or "essential".

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. An apparatus to be used with a current regulator and an inverter for supplying current to an induction machine on supply lines wherein the regulator includes a summer and a PI compensator, the summer for subtracting a predicted current signal from a current command signal to generate an error signal, the compensator receiving the error signal and modifying the error signal to generate the forcing signal, the forcing signal provided to the inverter for controlling inverter operation, the apparatus comprising:

a sampler linked to the supply lines for sampling actual current and providing a sampled current signal;

a predictor that receives the sampled current signal and the forcing signal and mathematically combines the sampled and forcing signals to generate a predicted current signal; and an adapter that receives the predicted current signal and the sampled signal and, when the predicted signal is greater than the sampled signal, causes the predictor to reduce the predicted signal and, when the predicted signal is less than the sampled signal, causes the predictor to increase the predicted signal.

2. The apparatus of claim 1 wherein the adapter includes at least a summer and a PI compensator and wherein the summer subtracts the absolute value of the predicted signal from the absolute value of the sampled signal to generate a difference signal and the PI regulator steps up the difference signal to generate a kicker signal, the predictor using the kicker signal to modify the predicted signal.

3. The apparatus of claim 2 further including an interface for providing a load inductance estimate and wherein the adapter further includes a second summer that adds the load inductance estimate and the kicker signal to generate an enhanced kicker signal, the predictor using the enhanced kicker signal to modify the predicted signal.

4. The apparatus of claim 3 wherein the predictor includes a scaler, a third summer and a multiplier and wherein the scaler receives the sampled current signal and increases the sampled signal by a scaler gain generating an enhanced sampled signal, the multiplier multiplies the enhanced kicker signal by the forcing signal generating an enhanced forcing signal and the third summer adds the enhanced forcing signal and the enhanced sampled signal to generate the predicted signal.

5. The apparatus of claim 4 wherein the scaler gain is a function of a load time constant $\tau$.

6. The apparatus of claim 5 wherein the scaler gain is $e^{-T/\tau}$ where T is the interval between current samples.

7. The apparatus of claim 5 wherein $\tau$ is L/rs where L is a load inductance and rs a load resistance.

8. The apparatus of claim 1 wherein a microprocessor comprises each of the predictor and adapter.

9. The apparatus of claim 7 wherein the interface is also used to provide a load time constant $\tau_{est}$ and the predictor uses the estimate $\tau_{est}$ as the load time constant $\tau$.

10. A method to be used with a current regulator and an inverter for supplying current to an induction machine on supply lines wherein the regulator includes a summer and a PI compensator, the summer for subtracting a predicted current signal from a current command signal to generate an error signal, the compensator receiving the error signal and modifying the error signal to generate the forcing signal, the forcing signal provided to the inverter for controlling inverter operation, the method comprising the steps of:
sampling actual current and providing a sampled current signal;
mathematically combining the sampled and forcing signals to generate a predicted current signal;
comparing the predicted and sampled signals; and
when the predicted signal is greater than the sampled signal, reducing the predicted signal and, when the predicted signal is less than the sampled signal, increasing the predicted signal.

11. The method of claim 10 wherein the step of comparing includes determining the absolute values of each of the predicted signal and the sampled signal, subtracting the absolute value of the predicted signal from the absolute value of the sampled signal to generate a difference signal and the steps of reducing and increasing include the steps of proportionally and integrally compensating the difference signal to generate a kicker signal and modifying the predicted signal as a function of the kicker signal.

12. The method of claim 11 also for use with an interface for providing a load inductance estimate and wherein the method further includes the steps of adding the load inductance estimate and the kicker signal to generate an enhanced kicker signal and using the enhanced kicker signal to modify the predicted signal.

13. The method of claim 12 further including the steps of increasing the sampled signal by a scaler gain generating an enhanced sampled signal, multiplying the enhanced kicker signal by the forcing signal generating an enhanced forcing signal and adding the enhanced forcing signal and the enhanced sampled signal to generate the predicted signal.

14. The method of claim 13 wherein the scaler gain is a function of a load time constant $\tau$.

15. The method of claim 14 wherein the scaler gain is $e^{-T/\tau}$ where T is the interval between current samples.

16. The method of claim 14 wherein $\tau$ is L/rs where L is a load inductance and rs is a load resistance.

17. A processor to be used with a current regulator and an inverter for supplying current to an induction machine on supply lines wherein the regulator includes a summer and a PI compensator, the summer for subtracting a predicted current signal from a current command signal to generate an error signal, the compensator receiving the error signal and modifying the error signal to generate the forcing signal, the forcing signal provided to the inverter for controlling inverter operation, the processor for running a pulse sequencing program to perform the steps of:
sampling actual current and providing a sampled current signal;
mathematically combining the sampled and forcing signals to generate a predicted current signal;
comparing the predicted and sampled signals; and
when the predicted signal is greater than the sampled signal, reducing the predicted signal and, when the predicted signal is less than the sampled signal, increasing the predicted signal.

18. The processor of claim 17 wherein the step of comparing includes determining the absolute values of each of the predicted signal and the sampled signal, subtracting the absolute value of the predicted signal from the absolute value of the sampled signal to generate a difference signal and the steps of reducing and increasing include the steps of proportionally and integrally compensating the difference signal to generate a kicker signal and modifying the predicted signal as a function of the kicker signal.

19. A processor to be used with a current regulator and an inverter for supplying current to an inductive load on supply lines wherein the regulator includes a summer and a PI compensator, the summer for subtracting a predicted current signal from a current command signal to generate an error signal, the compensator receiving the error signal and modifying the error signal to generate the forcing signal, the forcing signal provided to the inverter for controlling inverter operation, the processor running a pulse sequencing program to perform the steps of:
receiving a load time constant estimate $\tau_{est}$ and a load inductance estimate Kest;
sampling actual current and providing a sampled current signal every T period;
multiplying the sampled current signal by a scalor gain $e^{-T/\tau}$ to generate an enhanced sampled signal;
multiplying the-forcing signal by an enhanced kicker signal to generate an enhanced foraying signal
adding the enhanced forcing signal and the enhanced sampled signal to generate a predicted current signal that is provided to te regulator;
determining the absolute value of the predicted current signal and the absolute value of the sampled current signal;
subtracting the absolute value of the predicted current signal from the absolute value of the sampled current signal to generate a difference signal;
proportionally and integrally modifying the difference signal to generate a kicker signal; and
adding the kicker signal and the inductance estimate to generate the enhanced kicker signal.

* * * * *